United States Patent

McKeown et al.

[11] Patent Number: 5,923,644
[45] Date of Patent: Jul. 13, 1999

[54] APPARATUS AND METHOD FOR PROCESSING MULTICAST CELLS IN AN INPUT-QUEUED MULTICAST SWITCH

[75] Inventors: Nicholas William McKeown, Berkeley, Calif.; Ritesh Ahuja, Beltsville, Md.; Balaji Satyanarayana Prabhakar, Bristol, United Kingdom

[73] Assignee: The Board of Trustees of the Leland Stanford Junior University, Palo Alto, Calif.

[21] Appl. No.: 08/740,114

[22] Filed: Oct. 3, 1996

[51] Int. Cl.[6] .................................................. H04L 12/56
[52] U.S. Cl. .......................... 370/230; 370/415; 370/429
[58] Field of Search .................................. 370/412, 413, 370/414, 415, 416, 390, 229, 230, 389, 395, 428, 429

[56] References Cited

U.S. PATENT DOCUMENTS

| | | | |
|---|---|---|---|
| 5,126,999 | 6/1992 | Munter et al. | 370/415 |
| 5,164,939 | 11/1992 | Shobatake | 370/416 |
| 5,241,536 | 8/1993 | Grimble et al. | 370/416 |
| 5,255,265 | 10/1993 | Eng et al. | 370/416 |
| 5,287,346 | 2/1994 | Bianchini, Jr. et al. | 370/416 |
| 5,499,238 | 3/1996 | Shon | 370/379 |
| 5,500,858 | 3/1996 | McKeown | 370/60 |
| 5,537,400 | 7/1996 | Diaz et al. | 370/412 |

*Primary Examiner*—Alpus H. Hsu
*Attorney, Agent, or Firm*—Flehr Hohbach Test Albritton & Herbert LLP

[57] ABSTRACT

A method of operating an input-queued multicast switch includes the step of loading input cells into a set of input queues. Each of the input cells specifies one or more output cells. Selected output cells are accepted from head-of-line input cells of the set of input queues in a manner to concentrate unaccepted output cell residue among a subset of the set of input queues. This concentration operation can be performed in a number of ways. One technique is to assign weights to the head-of-line cells on the basis of cell age and cell fanout. Another technique to achieve concentration is to iteratively match unaccepted output cell residue to an input queue with the most output cells in common with the unaccepted output cell residue.

9 Claims, 8 Drawing Sheets

APPARATUS AND METHOD FOR PROCESSING MULTICAST CELLS IN AN INPUT-QUEUED MULTICAST SWITCH

BRIEF DESCRIPTION OF THE INVENTION

This invention relates generally to the processing of cells in a high-bandwidth input-queued switch, for instance as used in asynchronous transfer mode networks. More particularly, this invention relates to a technique of improving cell processing in an input-queued multicast switch by concentrating residue cells among limited queues of the input-queued switch.

BACKGROUND OF THE INVENTION

Networks are widely used to allow computers to communicate with one another. That is, a source computer uses a network to pass data to a destination computer. The data is typically divided into cells of information.

Networks originally evolved by relying upon a single link to communicate between computers. Examples of the single link architecture include Ethernet networks and Token Ring networks. The problem with a single link architecture is that it has limited data throughput.

In view of the bandwidth problems of a single link architecture, there is an increasing interest in arbitrary topology cell-based local area networks, such as Asynchronous Transfer Mode (ATM) networks. In these networks, computers are connected together by an arbitrary graph of communication links and switches. These networks provide improved bandwidth and fault tolerance.

To realize the potential advantages of arbitrary topology networks, a high performance switch is needed to take a cell arriving on an input link and quickly deliver it to the appropriate output link. A switch has three components: a physical switch, a scheduling mechanism to arbitrate when cells arrive on different inputs destined for the same output, and a queuing mechanism at inputs or outputs to hold those cells that lose the arbitration.

The queuing mechanism is used to store a set of incoming cells. Each incoming cell contains data and an identifier to indicate to which output it is destined. In the case of an ATM network, each cell has 48 bytes of data and 5 bytes of identification information. The physical switch can be implemented as a crossbar switch which allows any input to be routed to any output. As known in the art, a crossbar switch may be implemented as a matrix of transistors.

The construction of the physical switch and queuing mechanism is straightforward. However, the construction of a scheduling mechanism is rather complex and represents the performance bottleneck in most high throughput switches.

It is the job of the scheduling mechanism to identify a conflict-free match between inputs and the outputs of the switch. That is, the input cells at the input of the switch must be matched to particular outputs of the switch. In a "unicast" system, each input is connected to at most one output and each output is connected to at most one input. Parallel Iterative Matching (PIM) is a successful unicast scheduling technique that is described in U.S. Pat. No. 5,267,235, which is expressly incorporated by reference herein. PIM uses randomness to avoid starvation (a continuously unserviced input cell), and to reduce the number of iterations needed to converge on a maximal matching. PIM attempts to quickly converge on a conflict-free match in multiple iterations where each iteration consists of three phases. All inputs and outputs are initially unmatched and only those inputs and outputs not matched at the end of one iteration are eligible for matching in the next iteration.

A number of problems associated with the PIM technique were identified and solved in U.S. Pat. No. 5,500,858, which is expressly incorporated by reference herein. U.S. Pat. No. 5,500,858 describes a rotating priority iterative matching desynchronizing scheduler which improves the performance of the PIM system described in U.S. Pat. No. 5,267,235.

Both of these patents are directed toward unicast systems. Multicast systems potentially have higher bandwidth, but a fundamental design problem exists in relation to the scheduling of cells. In a multicast system, each input cell specifies one or more outputs, instead of a single output, as is the case in a unicast system. During a cell processing iteration, a multicast input cell may be sent to a number of its specified outputs, but other specified outputs may remain unserved. The unserved specified outputs are referred to as residue cells. The present invention is directed toward the positioning and processing of residue cells in an input-queued multicast switch.

SUMMARY OF THE INVENTION

The invention includes a method of operating an input-queued multicast switch. A first processing step of the method is to load input cells into a set of input queues. Each of the input cells specifies one or more output cells. Selected output cells are accepted from head-of-line input cells at the set of input queues in a manner to concentrate unaccepted output cell residue among a subset of the input queues. This concentration operation can be preformed in a number of ways. One technique is to assign weights to the head-of-line cells on the basis of cell age and cell fanout. Another technique to achieve concentration is to iteratively match unaccepted output cell residue to an input queue with the most designated output cells in common with the unaccepted output cell residue. Embodiments of the invention provide work-conserving, fair techniques that deliver maximum throughput and minimize input queue latency. Hardware embodiments of the invention are relatively simple to implement.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
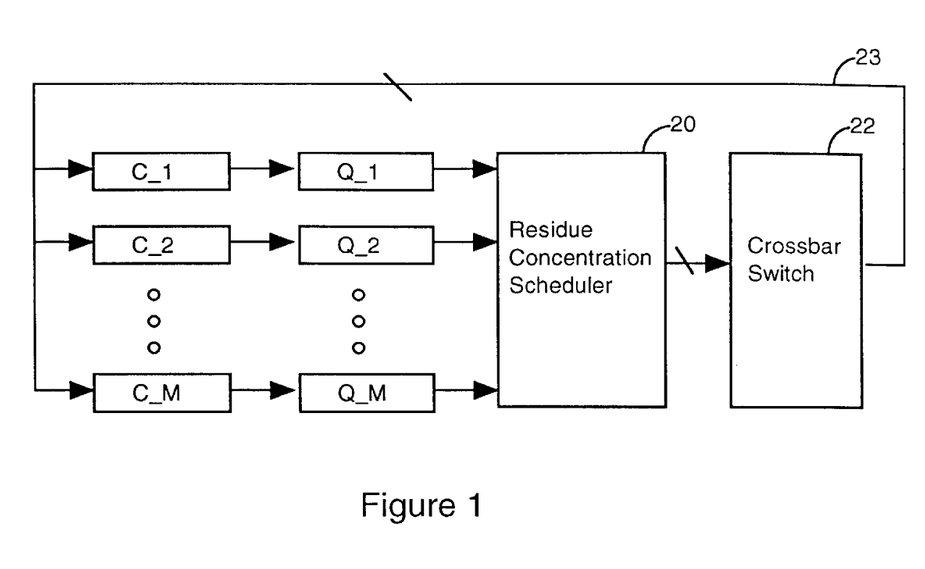
FIG. 1 illustrates an input queued switch with a residue concentration scheduler in accordance with an embodiment of the invention.

FIG. 1 is a general illustration of the apparatus of the invention and the environment in which it is used. FIG. 1 illustrates computers C_1, C_2, . . . , C_M, a corresponding set of input queues Q_1, Q_2, . . . , Q_M, a residue concentration scheduler 20, a crossbar switch 22, and a communication link 23 used to form a network. The network allows each computer C_1, C_2, . . . , C_M to communicate with every computer on the network. Computers C_b 1, C_2, . . . , C_M, input queues Q_1, Q_2, . . . , Q_M, and crossbar switch 22 are known in the art. The present invention is directed toward the residue concentration scheduler 20.

Figure 2:
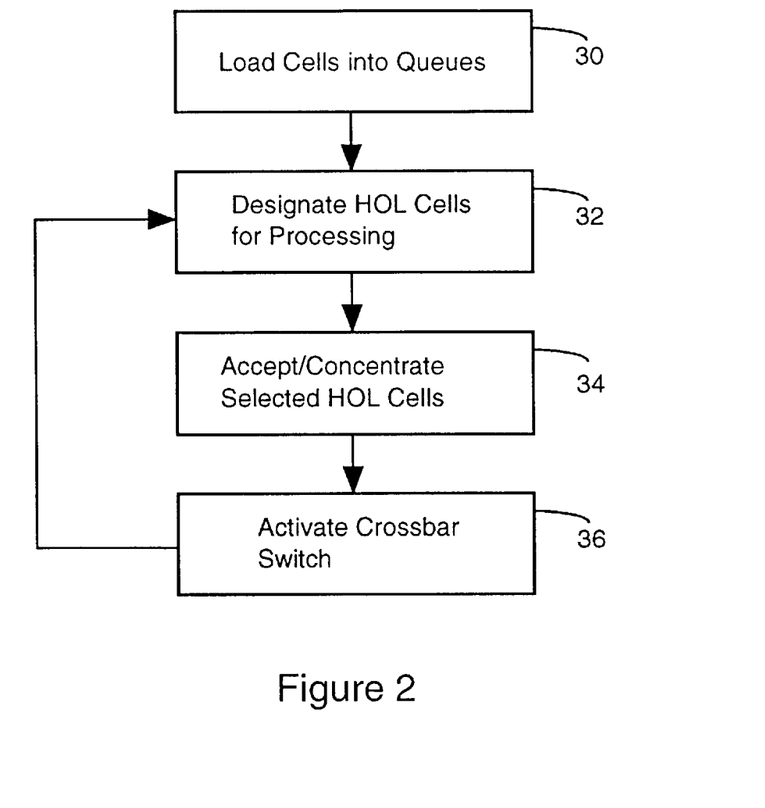
FIG. 2 illustrates a set of processing steps in accordance with an embodiment of the invention.

FIG. 2 illustrates the operations associated with the residue concentration processing of the invention. The first step associated with the method is to load arriving multicast cells into queues (block 30). Each multicast input cell specifies one or more output cells. In other words, each input multicast cell includes a data signal and a set of output device designation signals. The output device designation signals (different sets of bits) specify the output devices to which the data signal should be sent. The data signal (a set of bits) is the information that is passed to the designated output devices. The set of output cells is characterized as a request vector. The request vector has N destinations that may be specified. Thus, if M input queues exist, as shown in FIG. 1, then an M×N switch is required.

The next step associated with the process of FIG. 2 is to request access to the specified output devices (block 32). That is, for the M queues (Q_1 through Q_M), each cell at the head-of-line of the queue, requests access to one or more output devices. In other words, the request vector of each head-of-line cell of each queue is designated for processing.

After the request for access, access is granted (step 34) in accordance with an implementation of the residue concentration scheduler 20. Access is granted based upon a technique that concentrates unaccepted output cell residue among as few of the input queues as possible. Different embodiments of the residue concentration scheduler 20 are discussed below.

The next processing step is to activate the crossbar switch (block 36). This results in accepted output cells being transmitted to a destination computer (C_1, C_2, . . . , C_M). The process is then repeated.

The general principles of the invention have now been described. Attention will now turn to some examples of the operation of the invention in order to underscore its efficiencies and benefits.

Figure 3:
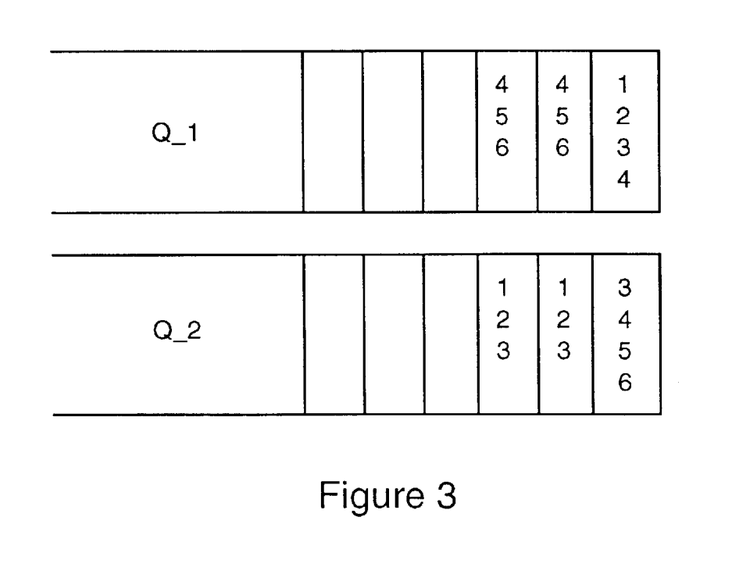
FIG. 3 illustrates two input queues and corresponding output request vectors which are described in relation to an example demonstrating an embodiment of the invention.

The invention is more fully appreciated with reference to the simple example illustrated in FIG. 3. FIG. 3 shows input queue Q_1 with a head-of-line multicast input cell with a request vector {1,2,3,4} and input queue Q_2 with a head-of-line multicast input cell with request vector {3,4,5,6}. The set of outputs to which an input cell wishes to be copied will be referred to as the fanout of that input cell. Thus, in FIG. 3, the input cell at the head of each queue has a fanout of size four. For clarity, an arriving input cell is distinguished from its corresponding output cells. In FIG. 3, the single input cell at the head of queue Q_1 will generate four output cells. Thus, it can be said that each input multicast cell specifies one or more output cells.

The input queues are necessary because cells at different inputs may wish to be copied to the same output port. At the end of each cell time (cell selection iteration), a scheduling policy decides which cells to copy to which output ports. The policy selects a conflict-free match between input and output ports such that each output receives at most one cell. Thus, at the end of every cell time, the scheduling policy discharges some output cells, possibly leaving behind some residual output cells at the head-of-line (HOL) of the input buffers. For example, in the situation depicted in FIG. 3, the discharge will consist of output cells for outputs {1,2,3,4,5,6}, and the residue will consist of output cells for outputs {3,4}. Observe that the decision of which cell inputs (which specified output cells for an HOL cell) to serve is equivalent to the decision of which inputs not to serve, making scheduling equivalent to deciding on residue placement. One can therefore define a scheduling policy in terms of how it elects to place the residue on different inputs. Stated differently, the scheduling policy can be defined in terms of which specified output cells it decides not to accept and thereby leaves in the input queues.

A scheduling policy may elect to place the residue on both inputs (i.e., it "distributes the residue"), or it may place the residue on either Q_1 only or on Q_2 only (i.e., it "concentrates the residue"). The present invention is directed toward techniques for implementing a scheduling policy which always "concentrates the residue". The disclosed techniques perform better (improve output utilization, reduce input queue latency, etc.) than techniques that do not always concentrate residue.

To reduce implementation complexity, the techniques of the invention stipulate that an input cell must wait in line until all of the cells ahead of it have gained access to all of the outputs that they have requested. Furthermore, it is assumed that the scheduling policy observes only the cell at the head of each input queue, without further knowledge of the contents of individual input buffers behind the HOL and traffic arrival patterns.

Perhaps the simplest way to service the input queues is to replicate the input cell over multiple cell times, generating one output cell per cell time. However, this service discipline does not take advantage of the multicast properties of the crossbar switch. So instead, it is assumed that one input cell can be copied to any number of outputs in a single cell time for which there is no conflict.

There are two different service disciplines that can be used. The first is no fanout-splitting in which all of the copies of a cell must be sent in the same cell time. If any of the output cells loses contention for an output port, none of the output cells are transmitted and the cell must try again in the next cell time. The second discipline is fanout-splitting, in which output cells may be delivered to output ports over any number of cell times. Only those output cells that are unsuccessful in one cell time continue to contend for output ports in the next cell time. It might appear that fanout-splitting is much more difficult to implement than no fanout-splitting. However this is not the case. In order to support fanout-splitting, one extra signal from the scheduler is needed to inform each input port when a cell at its HOL is completely served.

The foregoing and following discussions will be more fully appreciated through reliance upon the following definitions.

Residue: The residue is the set of all output cells that lose contention for output ports and remain at the HOL of the input queues at the end of each cell time. The residue at an input port is the set of output cells that originated from this input port and have lost contention for output ports. It is important to note that given a set of requests, every work-conseiving policy will leave the same residue. However, it is up to the policy to determine how the residue is distributed over the inputs.

Concentrating Policy: A multicast scheduling policy is said to be concentrating if, at the end of every cell time, it leaves the residue on the smallest possible number of input ports.

Distributing Policy: A multicast scheduling policy is said to he distributing if, at the end of every cell time, it leaves the residue on the largest possible number of input ports.

A Non-concentrating Policy: A multicast scheduling policy is said to be non-concentrating if it does not always concentrate the residue.

Fairness Constraint: A multicast scheduling policy is said to be fair if each input cell is held at the HOL for no more than a fixed number of cell times (this number can be different for different inputs). The fairness constraint ensures that inputs do not starve, and occasionally it is referred to as a "starvation constraint". For an M×N switch, it is not possible for the above bound to be less than M (simply consider the case where all new cells at HOL contend for the same set of outputs). However, it is possible that some input cells may be "opportunistically served" in less than M cell times because they do not contend with other input cells for outputs. In the case of a 2×N switch, if each input cell is required to be held at HOL for no more than two cell times, then this definition of fairness means that the residue alternates between the two inputs.

Relying upon the foregoing definitions, criteria for the residue concentration scheduler of the invention can be described. First, the technique must be work conserving, which means that no output port may be idle as long as it can serve some input cell destined to it. This property is necessary to provide maximum throughput. Second, the technique must meet the fairness constraint defined above, i.e., it must not lead to the starvation of any input.

The concentration technique of the invention always concentrates the residue onto as few inputs as possible. In accordance with the invention, there are a number of techniques for concentrating the residue. One such technique, referred to as the maximum concentration technique, performs the following steps at the beginning of each cell time.
1. Determine the residue.
2. Find the input with the most in common with the residue. If there is a choice of inputs, select the one with the input cell that has been at the HOL for the shortest time. This ensures some fairness, though not in the sense of the definition of fairness given above.
3. Concentrate as much residue onto this input as possible.
4. Remove the input from further consideration.
5. Repeat steps (2)–(4) until no residue remains.

The concentrating operation of the invention can be contrasted with a distribution technique. A distribution technique always distributes the residue onto as many inputs as possible. For example, the following steps may be used:
1. Determine the residue.
2. Find the input with at least one cell but otherwise the least in common with the residue. If there is a choice of inputs, select the one with the input cell that has been at the HOL for the shortest time.
3. Place one output cell of residue onto that input.
4. Remove the input from further consideration.
5. Repeat steps (2)–(4) until no inputs remain.

6. If residue remains, consider all the inputs again and start at step (2).

The concentration and distribution techniques can be more fully appreciated with reference to the example of FIG. 3. In reference to FIG. 3, consider the options faced by a work-conserving scheduling technique at time ($t_1$). Note that whatever approach is used, the residue will be the same. The scheduling technique just determines where to place the residue. If at time $t_1$, the technique concentrates the residue on Q_2 then all of Q_1's output cells will be sent and a new cell will be brought forward in Q_1 at time $t_2$. At time $t_2$, the technique selects between the new cell at Q_1 and the residue left over from $t_1$. If, on the other hand, the technique distributes the residue over both input queues at $t_1$, then at $t_2$ the technique can only schedule the residue left over from $t_1$. No new cells can be brought forward.

From the example above, the following intuitive argument may be made: it is more likely that the concentration technique will bring new work forward sooner, thus increasing the diversity of its choice. This enables more output cells to be scheduled in the following cell time. For the case of a 2×N switch, the previous argument can be rigorously proved.

Figure 4:
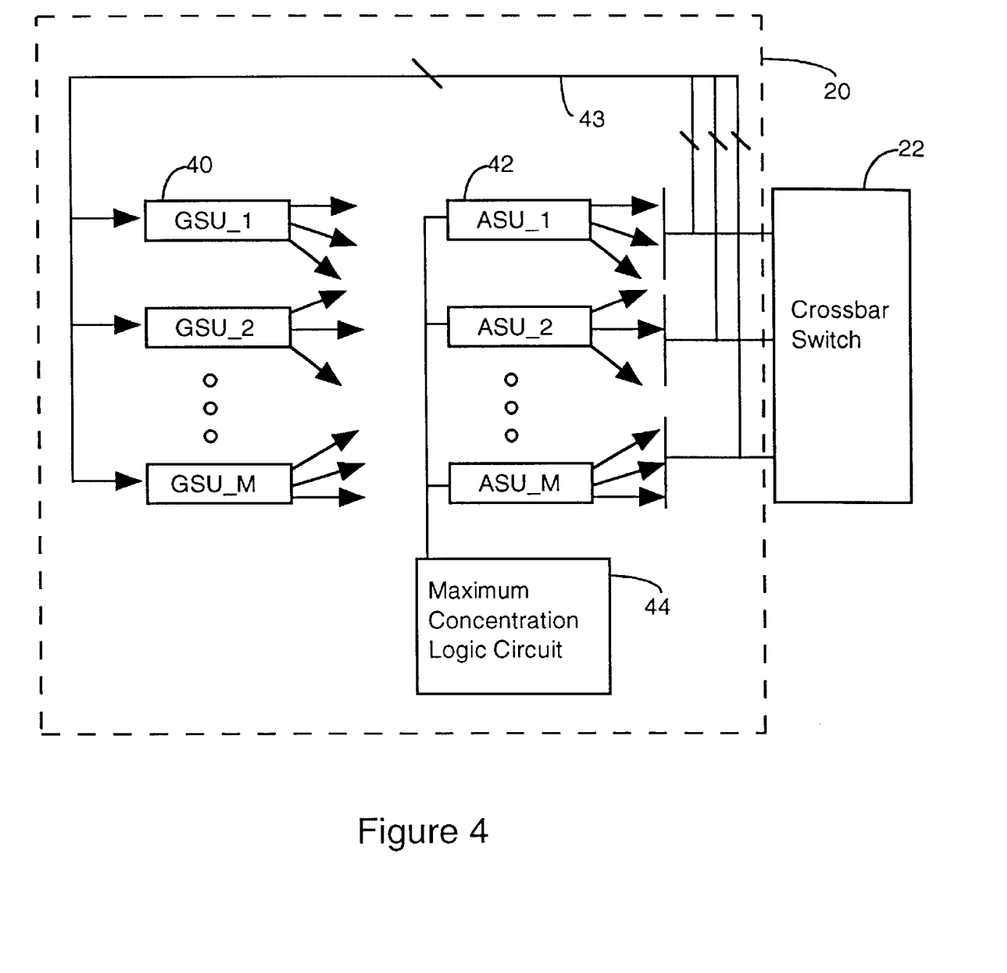
FIG. 4 illustrates a residue concentration scheduler in accordance with an embodiment of the invention.

FIG. 4 illustrates a residue concentration scheduler 20 in accordance with an embodiment of the invention. The residue concentration scheduler 20 includes a set of grant scheduler units 40 GSU_1 through GSU_N. Each grant scheduler unit 40 designates an HOL cell of a corresponding input queue for processing. In addition, the residue concentration scheduler 20 includes a set of accept scheduler units 42 ASU_1 through ASU_N. As indicated in the figure, each grant scheduler unit 40 is linked to each accept scheduler unit 42. Thus, each accept scheduler unit 42 can receive an output cell from each grant scheduler unit 40. Each accept scheduler unit 62 is connected to a maximum concentration logic circuit 44. The maximum concentration logic circuit 44 executes the logic specified in the maximum concentration technique described above. The accept scheduler units 42 accept selected output cells from the head-of-line input cells, as directed by the maximum concentration logic circuit 44. The accept scheduler units 42 generate grant signals for the accepted output cells. The grant signals are passed to the grant scheduler units 40 over bus 43.

Another residue concentrating embodiment of the invention may be implemented by weighting HOL cells. The processing steps associated with this technique are described in FIG. 5. The first processing step is to load cells into queues (step 50). Thereafter, weights are assigned to the head-of-line (HOL) cells (step 52). Subsequently, the HOL cells are designated for processing (step 54). The HOL cells with the highest weights are accepted for routing to the designated outputs (step 56). Finally, the crossbar switch is activated to route the selected cells to their respective outputs (step 58). The weighting technique used in accordance with the invention operates to concentrate the residue cells on a subset of input queues. The weighting technique is not as effective in concenitratinig residue as the maximum concentration technique, which concentrates residue on as few of the input queues as possible.

The weight-based residue concentration technique of the invention has been described. Attention presently turns to a more detailed discussion of the technique and specific hardware that may be used to implement the technique.

A processing technique that maximizes residue concentration, without regard to fairness, may achieve a high throughput but it can lead to starvation of some inputs. For example, in the concentration technique, an input requesting all the outputs may wait forever without being served. Conversely, if a technique aims to be fair, it may not achieve the best possible residue concentration and therefore sacrifices throughput.

The tradeoff between throughput and fairness suggests that, in order to choose the desired operating point between the two extremes of residue concentration and strict fairness, a technique needs to assess their relative importance. This can be done through the weight based technique of the invention. The technique works by assigning weights to input cells based on their age and fanout at the beginning of every cell time. Once the weights are assigned, each output chooses the heaviest input from among those subscribing to it. It is clear that, in the interests of achieving fairness, a positive weight should be given to age. To maximize throughput, fanout should be weighted negatively. That is, the lower the fanout, the heavier the input cell. The foregoing discussion leads to a fairly simple articulation of the weight based residue concentration technique of the invention.

1. At the beginning of every cell time, each input calculates the weight of the new cell/residue at its HOL based on:
   (A) The age of the cell/residue: The older, the heavier.
   (B) The fanout of the cell/residue: The larger, the lighter.
2. Each input then submits this weight to all the outputs that the cell residue at its HOL wishes to access.
3. Each output grants to the input with the highest weight, independently of other outputs, ties being broken randomly.

By making a suitable choice of weights based on these two quantities (age and fanout), one arrives at a compromise between the extremes of pure residue concentration and of strict fairness. Simple calculations show that if weight a is given to the age of the cell, and weight (−f) to the fanout, the bound on the time for which a cell has to wait at HOL is simply $(M+(f/a)N-1)$ cell times. In particular, if equal weight is given to age and to fanout, no cell waits at the HOL for longer than $(M+N-1)$ cell times. And if the negative weight of fanout is twice the weight of the age then one increases residue concentration and decreases fairness, allowing a cell to wait at the HOL up to $(M+2N-1)$ cell times.

Many variations of this weight based technique are possible. In particular, one can use other features to assign weights to the cells. For example, one can take into account input queue occupancy while computing weights, or keep track of the utilization of each output link and use negative weight to discourage inputs subscribing to heavily loaded outputs. When dealing with non-uniform loading or when offering different priorities to different inputs, one can use different formulae to compute weights at different inputs. However, these weights should be within the proper bound to ensure stability.

As indicated above, the weight based technique of the invention can be divided into two main parts: (1) Every input computes its weight, with which it will request each of the outputs in its destination vector, and (2) Every output chooses the input making request with the highest weight. Since the weight computation of an input does not depend on the weight of any other input, this part can be done separately at each input in parallel. Similarly, each output just chooses the input with the highest weight independently, and this part of the processing can be performed in parallel at each output. Hence the complexity of the technique is O(1). Not only is the technique well suited for parallel implementation, the logic required at each input (for part 1), and each output (for part 2) is relatively simple. An input just needs to subtract the fanout of the cell at HOL from its age, in order to compute its weight, and an output just needs a magnitude comparator (an M input magnitude comparator) to find the input with the highest weight. Circuits to perform these operations are shown in FIGS. 6–8.

Figure 5:
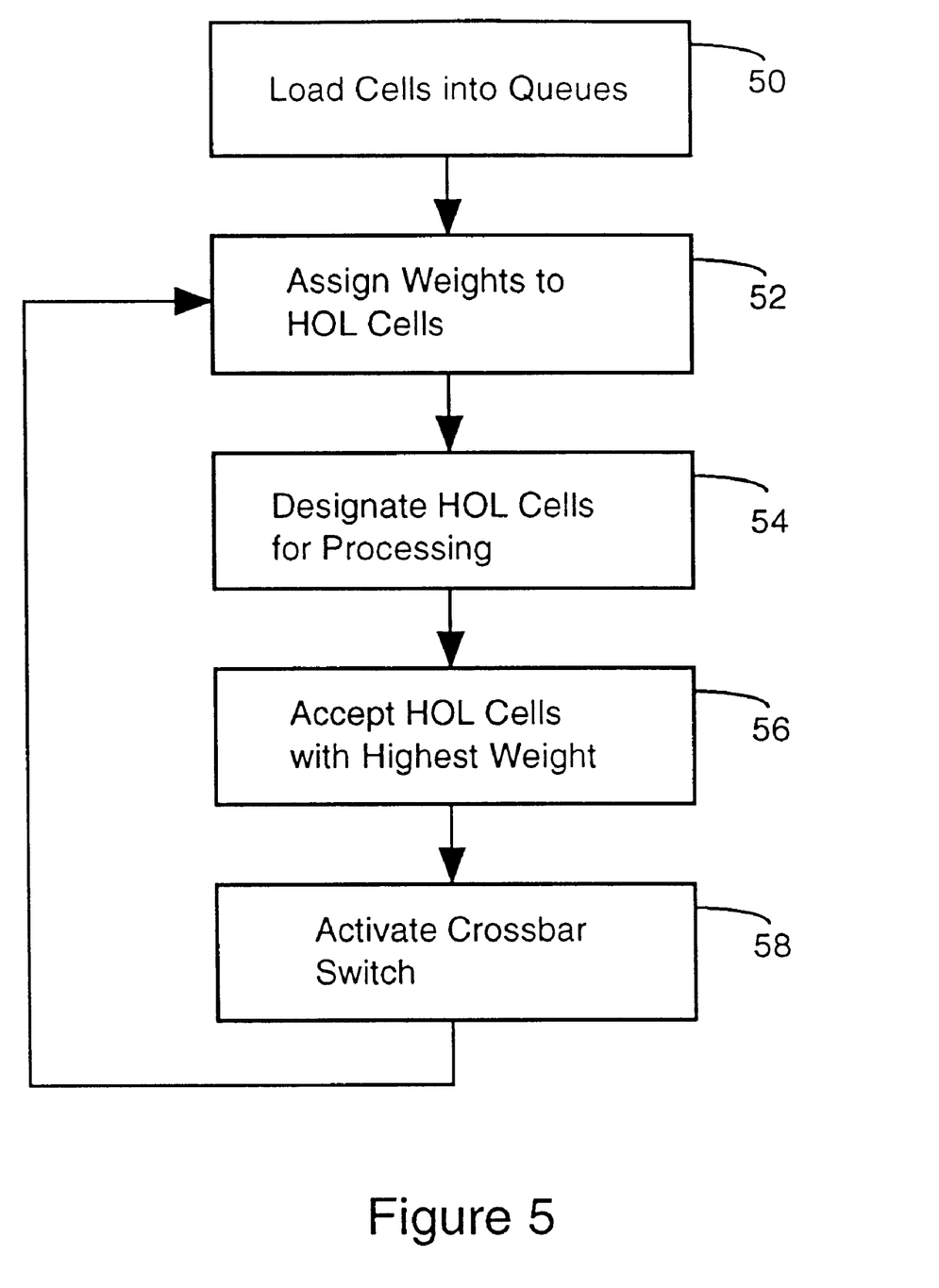
FIG. 5 illustrates a set of processing steps in accordance with an embodiment of the invention.
Figure 6:
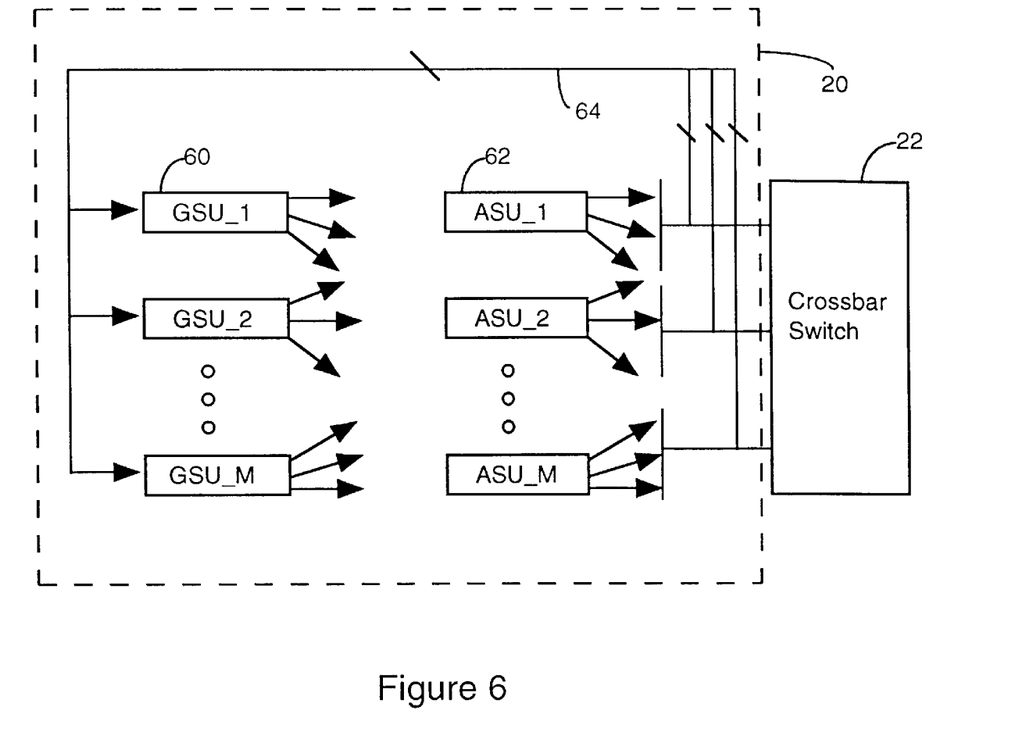
FIG. 6 illustrates a residue concentration scheduler in accordance with an embodiment of the invention.

FIG. 6 illustrates an apparatus for implementing the processing of FIG. 5. FIG. 6 illustrates that the residue concentration scheduler 20 includes a set of grant scheduler units 60 GSU_1 through GSU_N. In addition, the residue concentration scheduler 20 includes a set of accept scheduler units 62 ASU_1 through ASU_N. As indicated in the figure, each grant scheduler unit 60 is linked to each accept scheduler unit 62. The outputs from the accept scheduler units 62 are routed to the crossbar switch 22 and back to the grant scheduler units 60.

Figure 7:
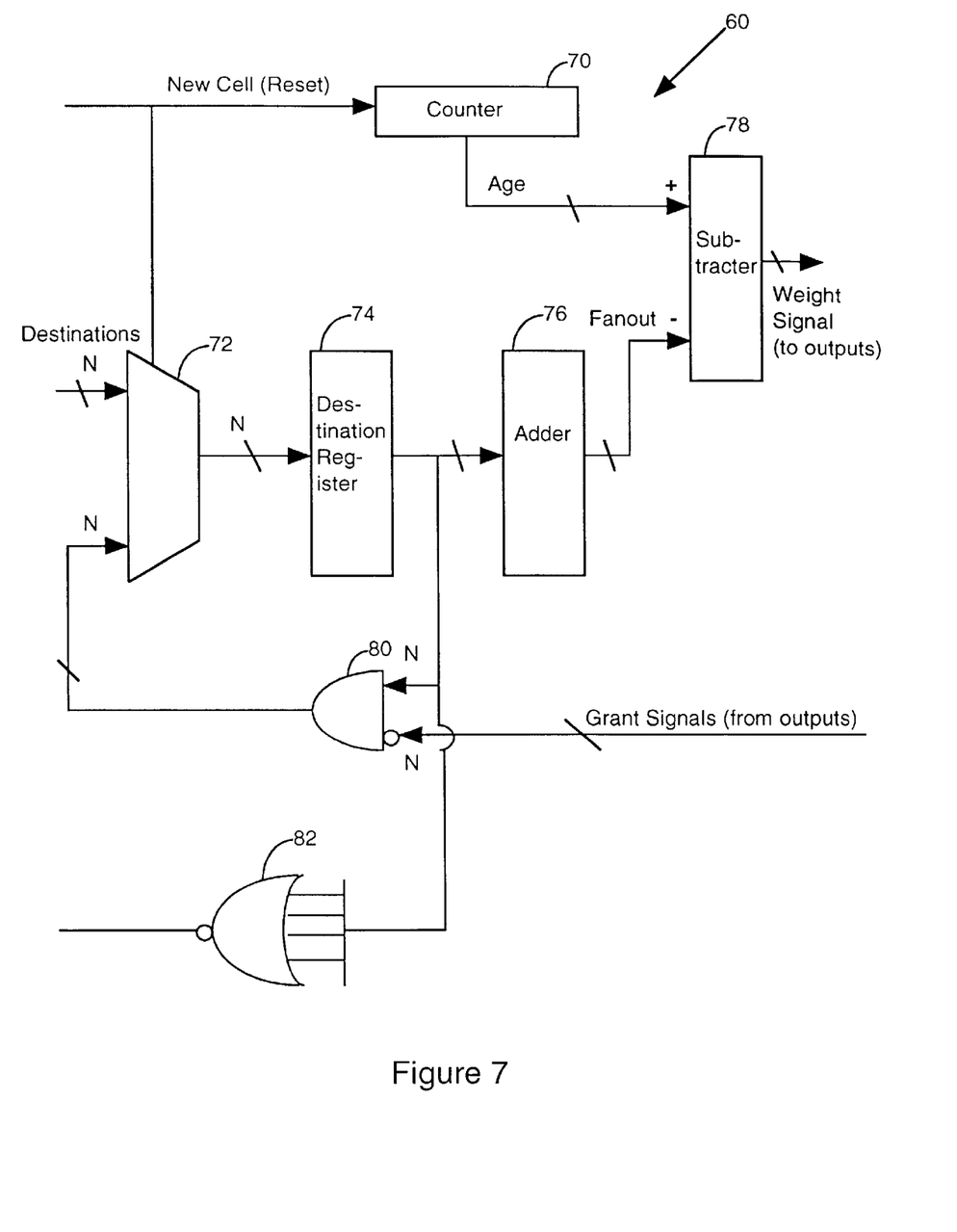
FIG. 7 illustrates a grant scheduling unit in accordance with an embodiment of the invention.
Figure 8:
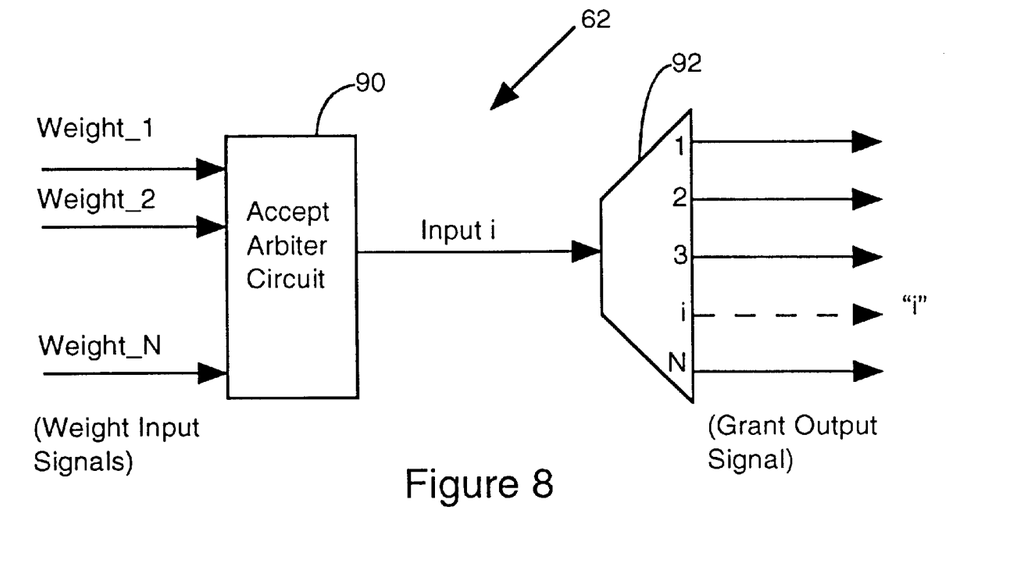
FIG. 8 illustrates an accept scheduling unit in accordance with an embodiment of the invention.

FIG. 7 illustrates a grant schedule unit 60 in accordance with an embodiment of the invention. The grant schedule unit 60 receives a new cell signal from a queue. The new cell signal is applied to a counter 70. This signal causes the counter to return to a reset value. The destinations to which the cell is to be sent is applied to a multiplexer 72. The new cell signal selects all of the inputs of the multiplexer. Suppose there are N output destinations. In this case, there is an input bit for each destination. If a destination is selected, then it is assigned a digital high value on the input line, otherwise it is assigned a digital low value on the input line. The set of received digital high and digital low signals is then stored in the destination register 74. An adder 76 is used to count the digital high signals in the destination register 74. The number of digital high signals is equivalent to the fanout of the cell. This fanout value is then subtracted, by a subtractor 78, from the age value provided by the counter 70. This results in a weight signal that is applied to each accept schedule unit 62 in the residue concentration scheduler 20.

When a grant signal is received from the accept schedule unit 62, it is applied to a logic circuit 80, in this case a logic AND gate, which operates to remove the granted signal from the list of output destinations. In other words, if a bit is set for an output destination in the destination register 74 and if the output destination is served, the grant signal operates, through the logic AND gate 80, to toggle the set bit. Thus, the new group of bits in the destination register 74 designate the residue that was not served. When all of the residue is finally served, the output of NOR gate 82 goes high, indicating that the cell has been routed to all outputs. Thus, a new cell can be loaded.

FIG. 8 illustrates an accept scheduler 62 which may be used in accordance with the invention. Each accept scheduler 62 includes an accept arbiter circuit 90, which receives the weighted values from the grant scheduler units 60. The accept scheduler 62 selects the highest valued signal ("i") and generates an output signal corresponding to it. The output signal is then applied to a demultiplexer 92, which generates one grant signal to the accept scheduler 62 with the highest weight value.

Attention now turns to another embodiment of the invention that uses residue concentration, but does not rely upon a weighting approach. This embodiment of the invention, referred to as TATRA, is described in reference to a variation of the popular block-packing game Tetris. In this context, one is able to describe and analyze any multicast scheduling policy in an intuitive and geometric fashion. Before intuitively motivating the connection between Tetris models and multicast scheduling, the class of scheduling policies to be considered in this section is described. The policies will be required to satisfy the following fairness constraint. A scheduling policy π for a M×N switch is said to be fair if no cell, from any input, is held at HOL for more than M cell times. In addition to requiring that policies be fair and work-conserving, they should also assign departure dates to input cells once the cells advance to HOL. This departure date (DD) is sonic number between 1 and M specifying how long, from the current cell time, the input cell will be held at HOL before being discharged. Once assigned, the DD of a cell cannot be increased, and is decremented by 1 at the end of each cell time. Clearly, this class of policies is smaller than the class of fair and work-conserving policies, since fairness allows one to reassign departure dates to input cells at HOL (but not beyond M cell times).

A "static input assumption" is used to describe the Tetris models. As will become clear, this description holds equally well for "dynamic inputs" since scheduling is based only on cells at HOL and there is no look-ahead.

The operation of an M×N multicast switch is mapped onto a Tetris-like game in the following fashion. It is imagined that every input cell is constituted of a number of identical copies of itself, each of these copies is thought of as an output cell. This allows input cells to be mapped onto Tetris blocks, each block will then be an amalgamation of smaller blocks, one per output cell. Upon assignment of DDs, the input cells at HOL will be dropped into a compartmentalized box of size M×N—each compartment or slot capable of holding one output cell. Each of the N columns of the box holds cells destined to a specific output; i.e., column j holds cells destined to output j. Refer to the example of a 5×5 switch shown in FIG. 9.

The labels on the cells denote the input port from which the cell has arrived; all the output cells with the same label result from the same input cell. The cells in the bottom-most row of the box in FIG. 9 at columns 1, 3 and 5 are all identical copies of a cell from input 1 destined to outputs 1, 3 and 5 (note that this input cell has a fanout of 3). Similarly, the cell at the HOL of input 2 wishes to access outputs 2, 3, 4 and 5.

Suppose that, at time n, the switch is to schedule k input cells which have advanced to HOL; i.e., there have been precisely k departures in the previous cell time. After the scheduler has assigned DDs to these input cells, they are dropped into the box which currently holds the cells or residues at the HoL of the other (M−k) inputs. The order in which the scheduler assigns DDs to the k new cells is important, because if the cells contend for the same outputs it may not be possible to assign them DDs in parallel. For example, suppose that two of the new cells have a fanout of 1 and are the only cells contending for a specific output. Then, deciding who goes first is important since no two cells in an output column can have the same DD. In general, the order of assignment of DDs can either be pre-fixed or made to depend upon some criterion (e.g., size of fanout). However, for ease of exposition, a pre-fixed ordering is assumed. Each new output cell may occupy any position in its appropriate output slot as long as (1) it does not alter the DD of any other cell, and (2) it does not leave any slots beneath it unoccupied. Again, referring to FIG. 9, note that there are no unoccupied slots between cells in any output column. The reason for this will become clear momentarily.

At the end of time n, all output cells at the bottom-most layer of the box are discharged and are assumed to be served. For the example in FIG. 9, input 1 is completely served and can advance a new cell to HOL at time 2. Input 2 discharges cells to outputs 2 and 4 and is left with a residue for outputs 3 and 5. Note that the discharge at any time is the set of output cells in the bottom-most layer and the residue is everything that's left behind. It should now be clear that unoccupied slots in output columns are not allowed because of the restriction to policies which are work-conserving; i.e., these gaps may lead to an idling of the output in the future.

At the beginning of time n+1, all residue cells drop down one level and their DDs are decremented by one. Those inputs which have been completely served in the previous cell time advance a new cell to the HOL. These cells are assigned DDs, and the cycle continues.

This is reminiscent of Tetris where blocks are dropped into a bin and the aim is to achieve maximum packing. The main difference here is that whereas Tetris blocks are rigid and cannot be decomposed, work-conservation will at times require that the various output cells constituting an input cell depart at different cell times. Note also that there are never more than M input cells in the box. Thus when an input cell is dropped into the box, it is guaranteed to depart within M cell times, since input cells arriving in the future do not alter its departure date. This automatically ensures fairness.

As mentioned earlier, if a plurality of cells advance to HOL at the beginning of a cell time, it is important to determine the order in which they are assigned DDs. In general, it is better to allow this ordering to depend on the constitution of the current residue and of the new cells. However, for simplicity, the following fixed ordering is chosen: for i<j the new cell at input i will be assigned its DD before the new cell at input j. Before proceeding to define a scheduling algorithm, the following definitions are established.

Tetris Box: The Tetris box is specified by a matrix $T_{ij}$, $1 \leq i \leq M$, $1 \leq j \leq N$, where the rows are numbered from bottom to top and the columns are numbered from left to right. Thus $T_{1,1}$ is the bottom-left slot of the box and $T_{M,N}$ is the top-right slot.

Occupancy Set: The occupancy set of the cell or residue at the HOL of input 1 at time n is given by $O_1(n)=T_{ij}$: an output cell of 1 resides at $T_{ij}$ at time n.

Peak Cell and Departure Date: An output cell belonging to input 1 is said to be a peak cell at time n if it occupies a slot in the row whose number is given by $$\max\{i: T_{ij} \in Q_1(n)\}.$$

The corresponding row number is the departure date (DD) of the input cell at time n. That is, the peak cell of an input is one which is furthest from the bottom of the box and the distance from the bottom is its departure date. Note that there may be more than one peak cell for a given input.

Scheduling Policy: Given $k \leq M$ new cells $c_1, c_2, \ldots, c_k$ at the HOL of inputs $i_1 < i_2 < \ldots < i_k$ at time n, a scheduling policy π is given by a sequence of decisions $\{\pi(n), n \in Z^+\}$, where π(n) associates to each of $c_1, c_2, \ldots, c_k$ (in that order) the corresponding occupancy sets $O_{C1}(n), OC_2(n), \ldots, O_{ck}(n)$ subject to the following rules.

1) No cell should change the DD of a cell that is already scheduled. This means that no peak cells should be raised or lowered.

2) For every i and j, if $T_{ij}$ and $T_{i+2j}$ are occupied, then so is $T_{i+1j}$; i.e., there should be no gaps in the output columns.

Given the above definitions, the algorithm for implementing a policy π just requires a specification for transitioning from one cell time to the next. The following steps enumerate the procedure.

a) At the end of time n, all output cells occupying slots in the set $\{T_{1j}, 1 \leq j \leq N\}$ are discharged. In particular, input cells (or residues thereof) with DDs=1 are completely served.

b) Each output cell occupying slot $T_{ij}$ for i and j in the set $\{2 \leq i \leq M, 1 \leq j \leq N\}$ is assigned to the slot $T_{i-1j}$. The occupancy set, peak cell(s), and the departure dates of the residue are recomputed. For example, the occupancy set of the residue at input 1 is given by $O_1(n+1) = \{T_{ij}: T_{i+1j} \in O_1(n)\}$. From this peak cells and DDs are easily computed.

c) New cells advancing to HOL are then scheduled according to $\pi(n+1)$.

Figure 9:
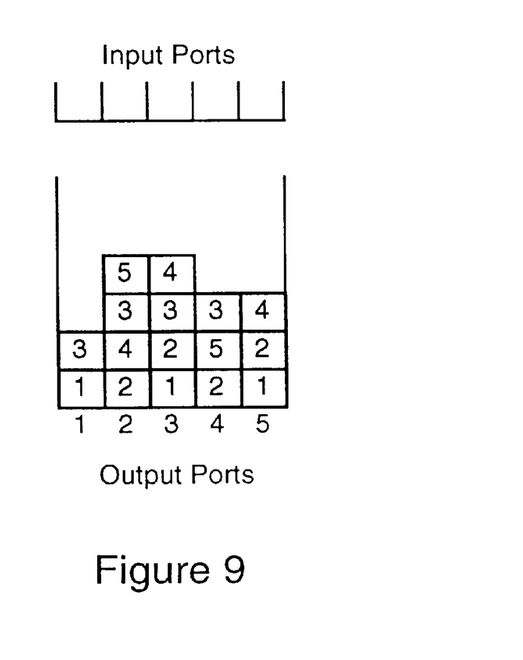
FIGS. 9–13 illustrate different Tetris block-packing boxes that are used to describe an embodiments of the invention.

Returning, again to the example of FIG. 9, the input cells are scheduled in the order 1, 2, 3, 4 and 5. The occupancy sets, peak cells and departure dates at time 1 are given in the table below.

TABLE 1

| Input Port | Occupancy Set $O_1(1)$ | Peak Cells $Pc_1(1)$ | Departure Date $DD_1(1)$ |
|---|---|---|---|
| 1 | $\{T_{1,1}, T_{1,3}, T_{1,5}\}$ | $O_1(1)$ | 1 |
| 2 | $\{T_{1,2}, T_{2,3}, T_{1,4}, T_{2,5}\}$ | $\{T_{2,3}, T_{2,5}\}$ | 2 |
| 3 | $\{T_{2,1}, T_{3,2}, T_{3,3}, T_{3,4}\}$ | $\{O_3(1) - \{T_{2,1}\}$ | 3 |
| 4 | $\{T_{2,2}, T_{4,3}, T_{3,5}\}$ | $\{T_{4,3}\}$ | 4 |
| 5 | $\{T_{4,2}, T_{2,4}\}$ | $\{T_{4,2}\}$ | 4 |

Figure 10:
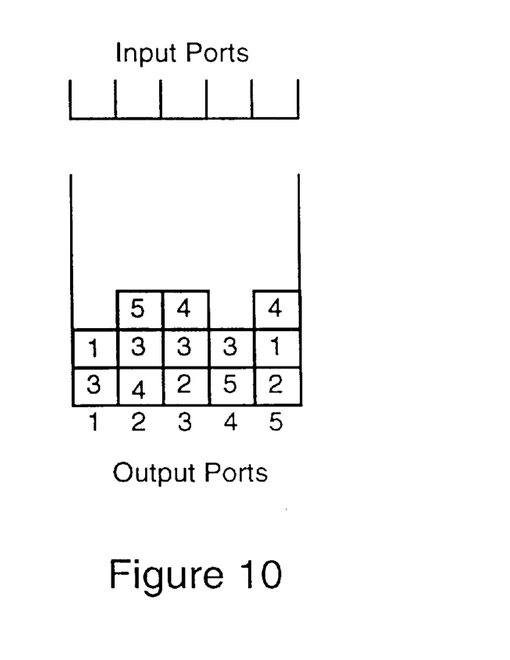
Figure 11:
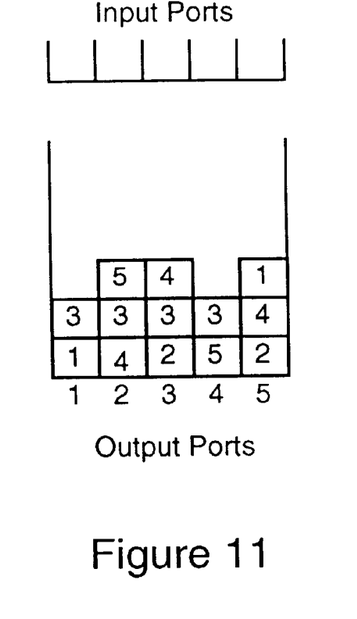

At the end of cell time 1, input 1 is completely served and advances a new cell to HOL. Suppose that this new cell wishes to access outputs 1 and 5. FIGS. 10 and 11 show two different ways of scheduling the new cell.

Motivated by the described Tetris models, a specific multicast scheduling technique, TATRA, can be described. Again it is assumed that the switch has been idle prior to time 0 and that the "static input assumption" holds. We denote by $\pi^* = \{\pi^*(n), n \in Z^+\}$ the policy TATRA. Since TATRA schedules input cells solely based on their DDs, it is assumed that this number is stamped upon all the output cells belonging to a specific input cell (both peak and non-peak cells). For time $n \geq 1$, the algorithm is specified by the following steps.

(1) At the beginning of time n, $\pi^*(n)$ assigns a DD to each new cell at HOL according to the formula given in the equation below. The order in which the DD is assigned when there is a plurality of new cells is in increasing order of their input port numbers.

(2) Each new output cell is dropped to the lowest possible level in the appropriate output slot, without getting ahead of another cell whose DD is less than or equal to its own. It follows that a non-peak cell cannot be ahead of a peak cell unless it has the same DD as the peak cell. If such a non-peak cell exists, it is called a pseudo-peak cell (an example of a pseudo-peak cell is given below). Corresponding to each output slot, there is thus a (possibly empty) column of peak/pseudo-peak cells. This column is called the peak column.

Figure 12:
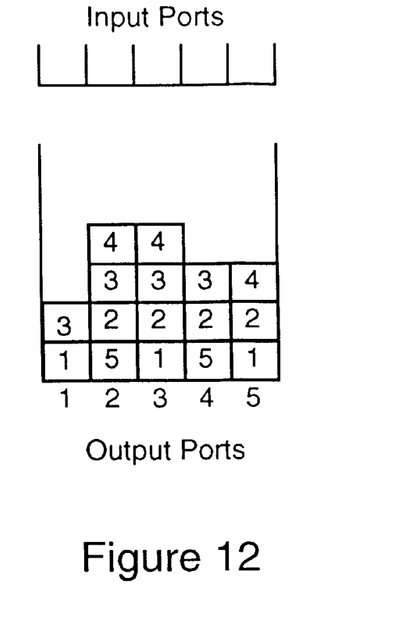
Figure 13:
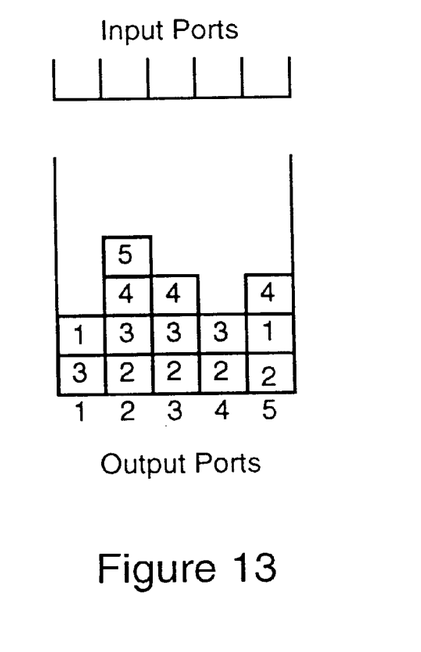

(3) Cells in the bottom-most row are discharged. New DDs are computed for the residue cells. Time is advanced to n+1. Using the terminology introduced above, and from the constitution of a new input cell its DD is computed as follows DD=max {height of peak columns across fanout}+1. By applying the above technique to the example of FIG. 9, it is fairly easy to see that TATRA schedules the cells as shown in FIG. 12. Assuming that at the end of time 1 the two new cells at inputs 1 and 5 wish to access outputs {1,5} and {2} respectively, FIG. 13 shows how TATRA schedules them. Observe that in FIG. 13, the cell from input 3 at position $T_{1,1}$ is a pseudo-peak cell because the cell at input 3 has a DD equal to 2 which is the same as the cell from input 1. Therefore, the height of the peak column corresponding to output 1 in FIG. 13 is equal to 2.

Under TATRA there is guaranteed to be a discharge every cell time. This is equivalent to the statement that there is a peak cell in every row of the Tetris box. To see this, merely observe that (1) under every peak cell there is a column of peak (or pseudo-peak) cells, and (2) the cell furthest from the bottom of the box must be a peak cell.

The residue concentration property of TATRA can be described as follows. Suppose that the occupancy sets, $O_1(n)$ and $O_m(n)$, of two input cells 1 and m are provided. If $T_{ij} \in O_1(n)$ and $T_{i+kj} \in O_m(n)$ for some j and for some k>0, then it is impossible that there exists an output j'≠j such that $T_{i'j'} \in O_1(n)$ and $T_{i'-k'j'} \in O_m(n)$, where k'>0. That is occupancy sets cannot "criss-cross". This follows from the fact that output cells are arranged in output columns according to a monotonic increase of DDs. The no criss-crossing property corresponds to residue concentration. To see this, note that for the example of FIG. 10, cells from inputs 4 and 5 are criss-crossing each other. At the end of the current cell time, one output cell from each of inputs 4 and 5 is discharged leaving a residue on both. This distribution of residue can be prevented by avoiding crisscross; i.e., by simply swapping the positions of cells from inputs 4 and 5 in output column 2.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. A method of operating an input-queued multicast switch, said method comprising the steps of:

loading input cells into a plurality of input queues, each of said input cells specifying one or more output cells; and accepting selected output cells from head-of-line input cells of said plurality of input queues to concentrate unaccepted output cell residue among a subset of input queues of said plurality of input queues.

2. The method of claim 1 wherein said accepting step includes the step of assigning weights to said head-of-line input cells to concentrate unaccepted output cell residue among a subset of input queues of said plurality of input queues.

3. The method of claim 1 wherein said accepting step includes the steps of:

(a) determining unaccepted output cell residue;

(b) identifying a remaining input queue with specified output cells that have the most in common with said output cell residue;

(c) consolidating as much output cell residue onto said remaining input queue as possible;

(d) removing said remaining input queue from further consideration; and (e) repeating steps (b) through (d) until no output cell residue remains and said unaccepted output cell residue is concentrated on as few of said plurality of input queues as possible.

4. The method of claim 1 wherein said accepting step includes the steps of:

assigning a departure date to each head-of-line input cell of said head-of-line input cells; and dropping new, non-residue input cells to the lowest possible level in said plurality of queues without passing another input cell with a departure date less than or equal to its own.

5. The method of claim 4 wherein said assigning step includes the step of assigning said departure date to be equal to the maximum height of peak columns across cell fanout plus one.

6. A method of operating an input-queued multicast switch, said method comprising the steps of:

loading input cells into a plurality of input queues, each of said input cells specifying one or more output cells;

assigning weights to head-of-line input cells and corresponding output cells in said plurality of input queues on the bases of cell age and cell fanout;

accepting selected output cells for servicing based upon said weights, said assigning and accepting steps operating to concentrate unselected output cell residue among limited queues of said plurality of queues; and routing said selected output cells to output ports.

7. An input-queued multicast switch, comprising:

a plurality of input queues to store input cells, each of said input cells specifying one or more output cells; and a residue concentration scheduler to process selected output cells in such a manner as to concentrate unselected output cell residue among a subset of said plurality of input queues.

8. The apparatus of claim 7 wherein said residue concentration scheduler assigns weights to head-of-line input cells and corresponding output cells of said plurality of input queues to concentrate output cell residue among a subset of said plurality of input queues.

9. An input-queued multicast switch, comprising:

a plurality of input queues to store input cells, each of said input cells specifying one or more output cells;

a residue concentration scheduler including a plurality of grant scheduling units, each of said grant scheduling units including circuitry to assign a weight to a head-of-line input cell and corresponding output cells from a queue of said plurality of queues on the bases of cell age and cell fanout, and a plurality of accept scheduling units, each of said accept scheduling units including circuitry to accept a selected output cell for servicing based upon a weight value, said residue concentration scheduler thereby operating to concentrate unselected output cell residue among limited queues of said plurality of queues; and a crossbar switch to route selected output cells to output ports.

* * * * *